Figure 1:
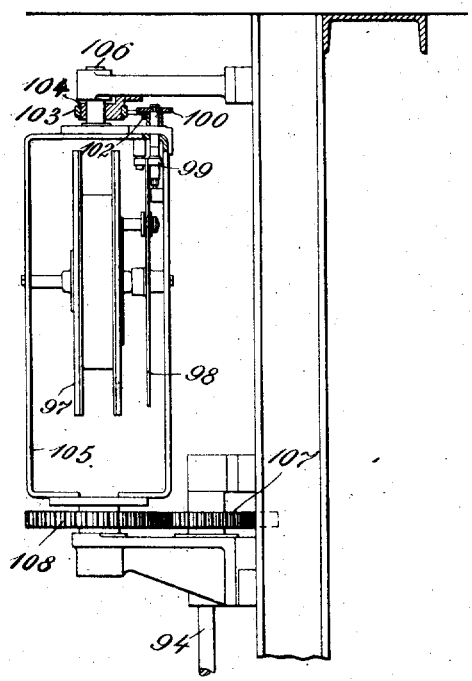

No. 893,661. PATENTED JULY 21, 1908.
W. SCHWARZ.
MACHINE FOR WINDING METALLIC HOSE.
APPLICATION FILED DEC. 11, 1906.

10 SHEETS—SHEET 1.

Witnesses:
P. F. Nagle.
L. Douville.

Inventor:
Wilhelm Schwarz,
By Diedersheim & Fairbanks,
Attorneys.

No. 893,661. PATENTED JULY 21, 1908.
W. SCHWARZ.
MACHINE FOR WINDING METALLIC HOSE.
APPLICATION FILED DEC. 11, 1906.
10 SHEETS—SHEET 3.
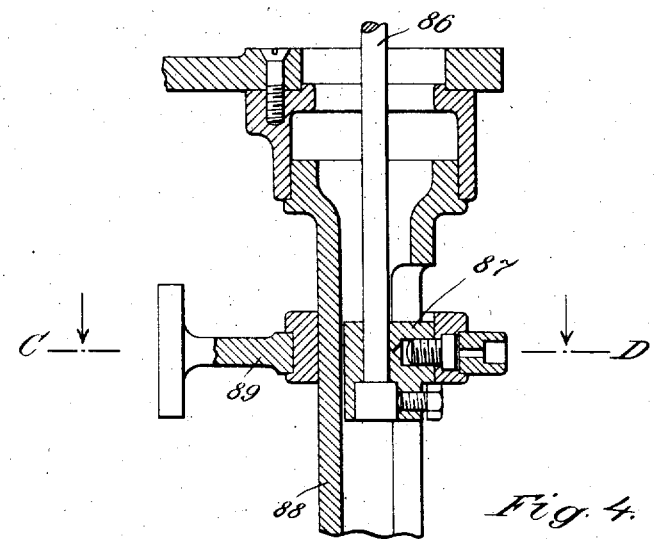
Fig. 4.
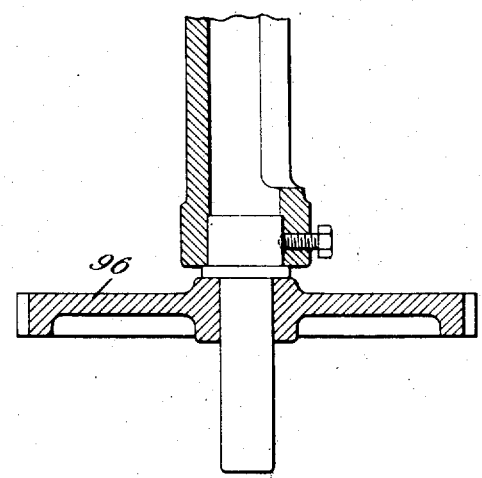
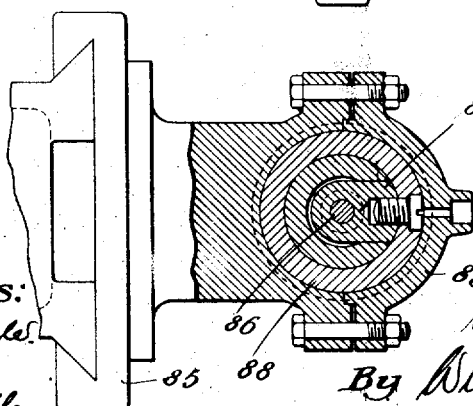
Fig. 5.
Witnesses:
P. F. Nagle.
L. Douville.
Inventor
Wilhelm Schwarz,
By Wiedersheim & Fairbanks
Attorneys.

No. 893,661. PATENTED JULY 21, 1908.
W. SCHWARZ.
MACHINE FOR WINDING METALLIC HOSE.
APPLICATION FILED DEC. 11, 1906.
10 SHEETS—SHEET 4.
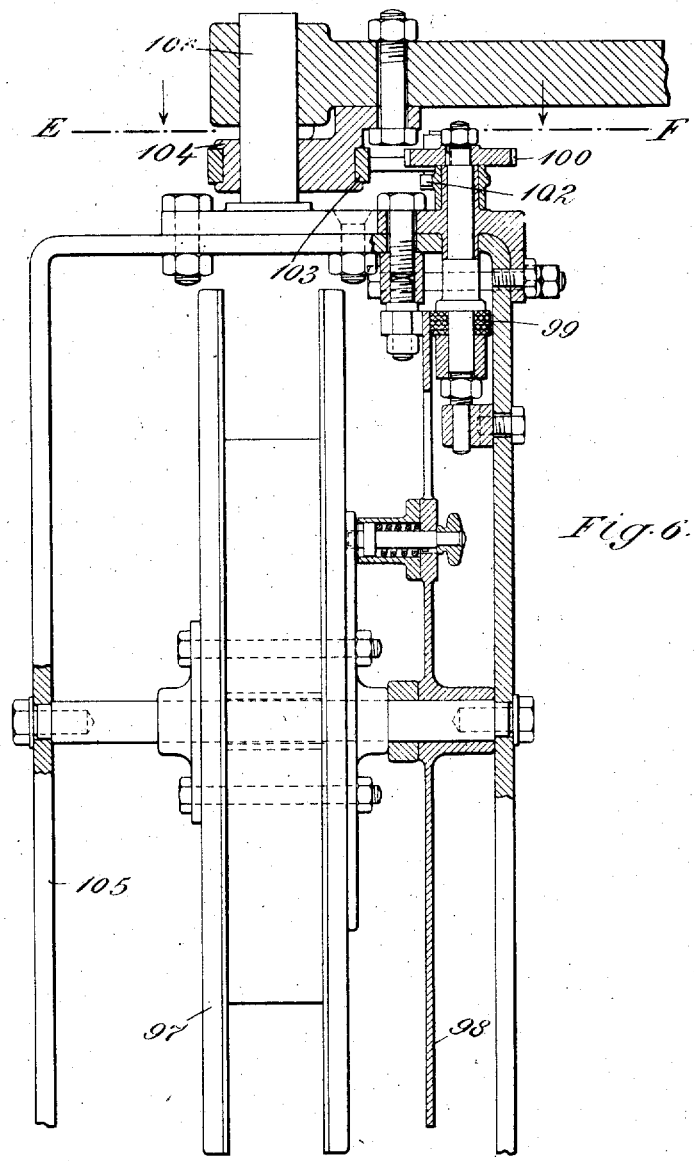
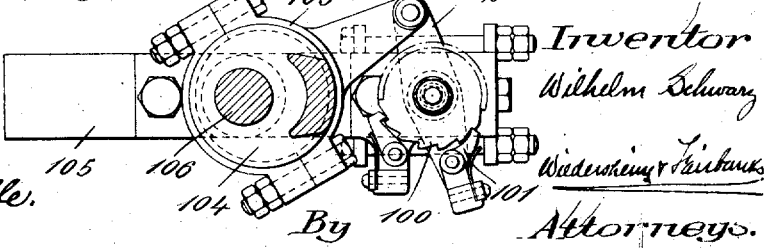

No. 893,661. PATENTED JULY 21, 1908.
W. SCHWARZ.
MACHINE FOR WINDING METALLIC HOSE.
APPLICATION FILED DEC. 11, 1906.
10 SHEETS—SHEET 5.
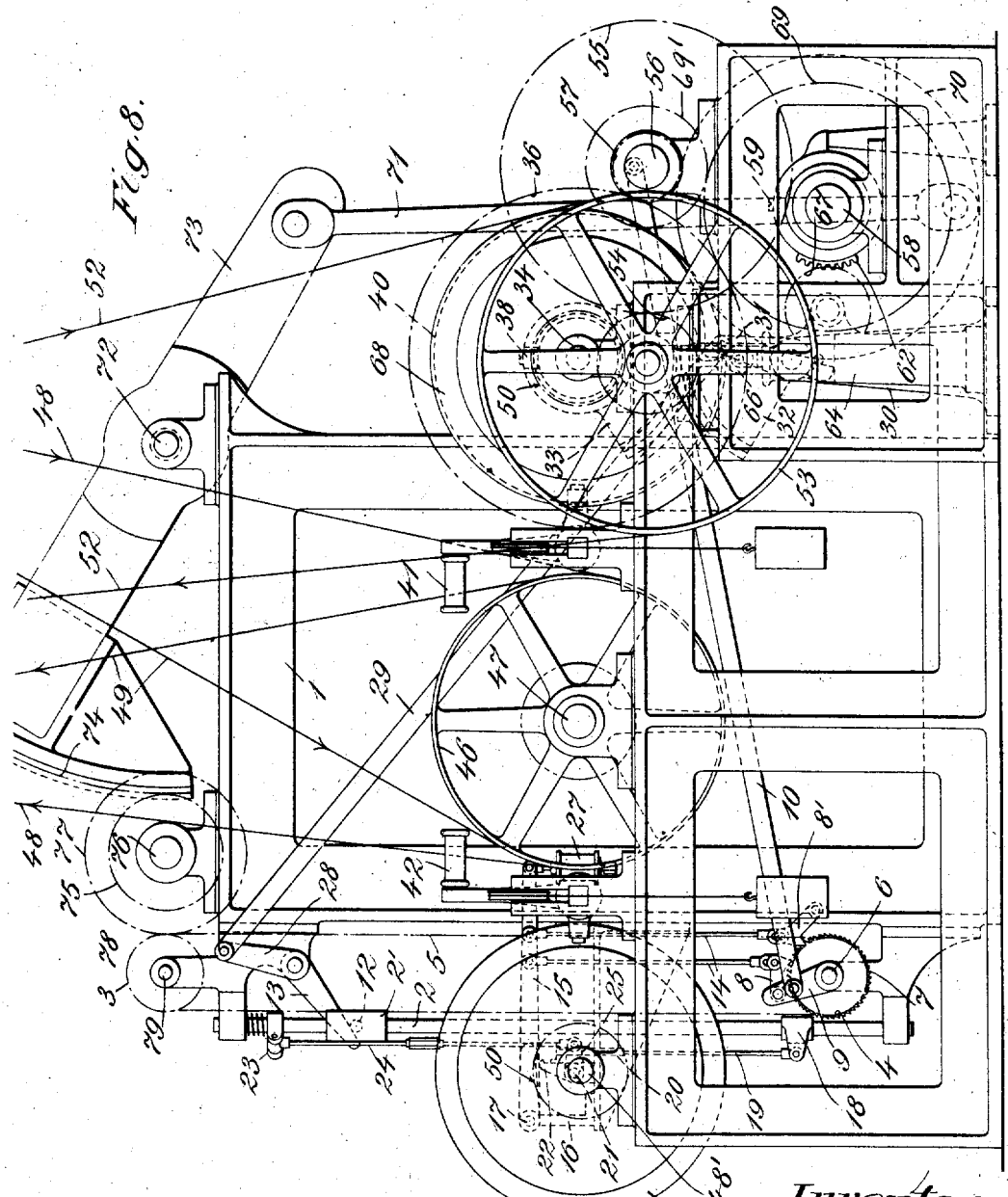
Witnesses:
P. F. Nagle.
L. Douville.
Inventor
Wilhelm Schwarz.
By
Biedersheim & Fairbanks
Attorneys.

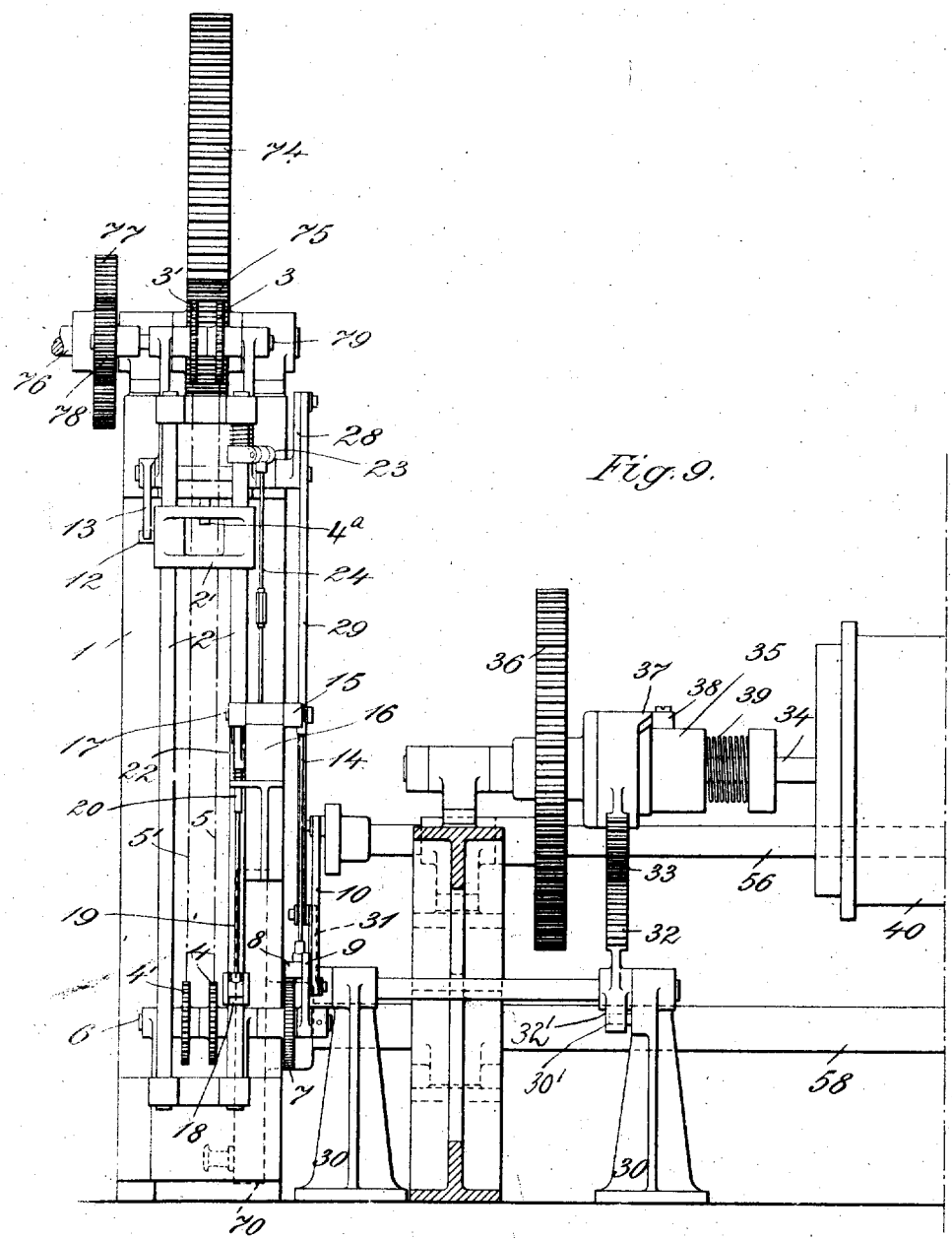

No. 893,661. PATENTED JULY 21, 1908.
W. SCHWARZ.
MACHINE FOR WINDING METALLIC HOSE.
APPLICATION FILED DEC. 11, 1906.

10 SHEETS—SHEET 7.

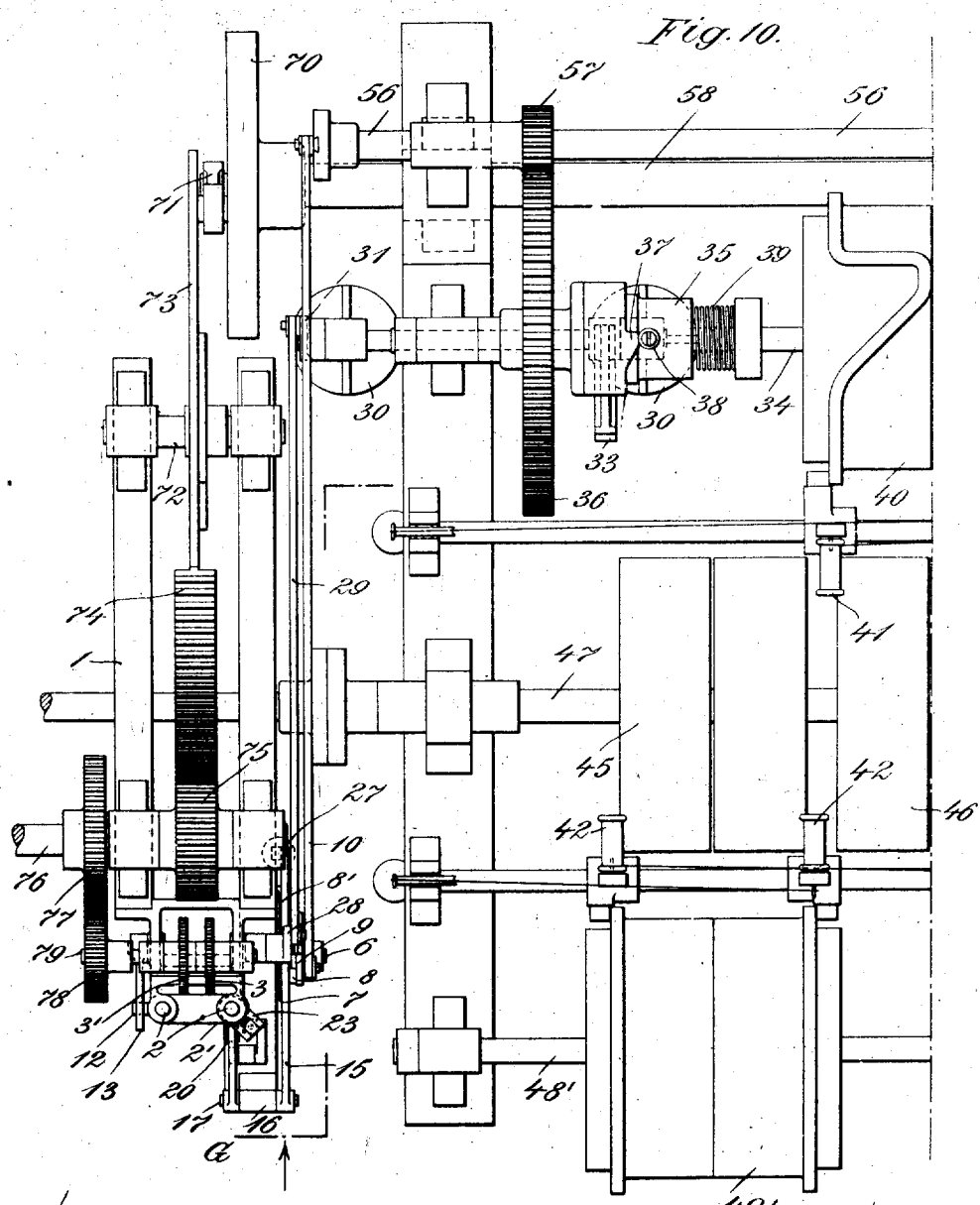

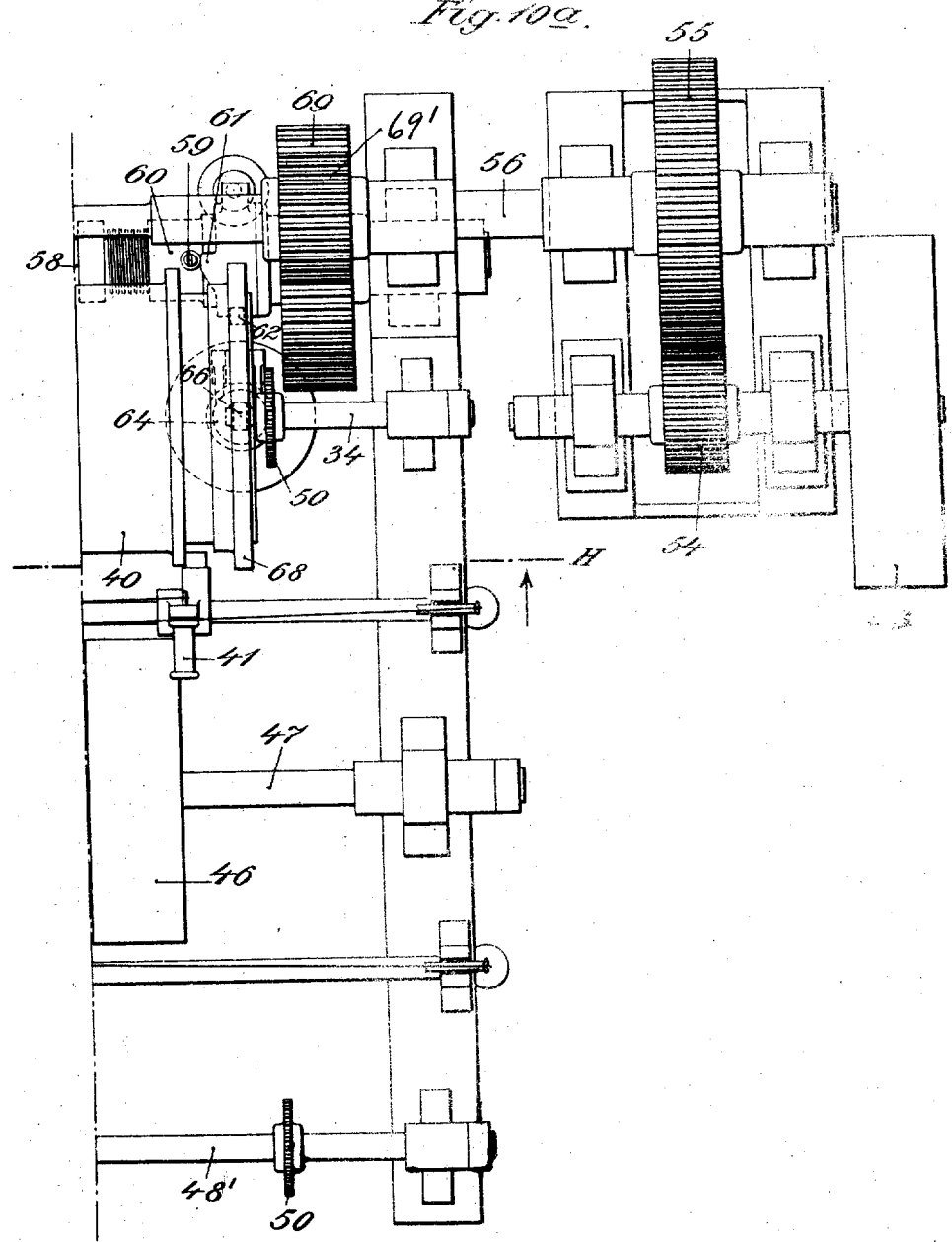

No. 893,661. PATENTED JULY 21, 1908.
W. SCHWARZ.
MACHINE FOR WINDING METALLIC HOSE.
APPLICATION FILED DEC. 11, 1906.
10 SHEETS—SHEET 10.

Witnesses:
P. F. Nagle.
L. Douville.

Inventor.
Wilhelm Schwarz,
Wiedersheim & Fairbanks
By Attorneys.

UNITED STATES PATENT OFFICE.

WILHELM SCHWARZ, OF PFORZHEIM, GERMANY, ASSIGNOR TO EMIL WITZENMANN, OF PFORZHEIM, GERMANY.

MACHINE FOR WINDING METALLIC HOSE.

No. 893,661.  Specification of Letters Patent.  Patented July 21, 1908.

Application filed December 11, 1906. Serial No. 347,268.

*To all whom it may concern:*

Be it known that I, WILHELM SCHWARZ, engineer, a subject of the Grand Duke of Baden, residing at Zähringer Allee, Pforzheim, German Empire, have invented new and useful Improvements in Machines for Winding Metallic Hose, of which the following is a specification.

My invention relates to improvements in machines for winding metallic hose, such as that disclosed in my United States patent application, Serial No. 849,858. In this machine the finished hose is released and the machine reversed by means of gear which is thrown in and out by the slide which carries the winding mandrel.

According to my present invention the apparatus for starting and reversing the motion and for returning the slide is independent of the actual winding machine, so that several winding machines may be coupled with and operated by a single such apparatus.

The principle of this apparatus is that a slide, reciprocating on vertical guide-rods by means of chain gear and ratchet wheel, is slowly advanced from below up to its highest position. On arriving in this top position the slide strikes a lever, which throws in a toothed clutch, whereby the backward motion of the winding machine and thereupon the quick descent of the slide are brought about. In its bottom position, the slide again throws in the ratchet wheel and chain gear, which was disengaged when the slide was in its top position, and the upward travel and the forward motion of the winding machine commence anew.

One form of construction of such a winding machine is illustrated in the accompanying drawings.

Figure 3:
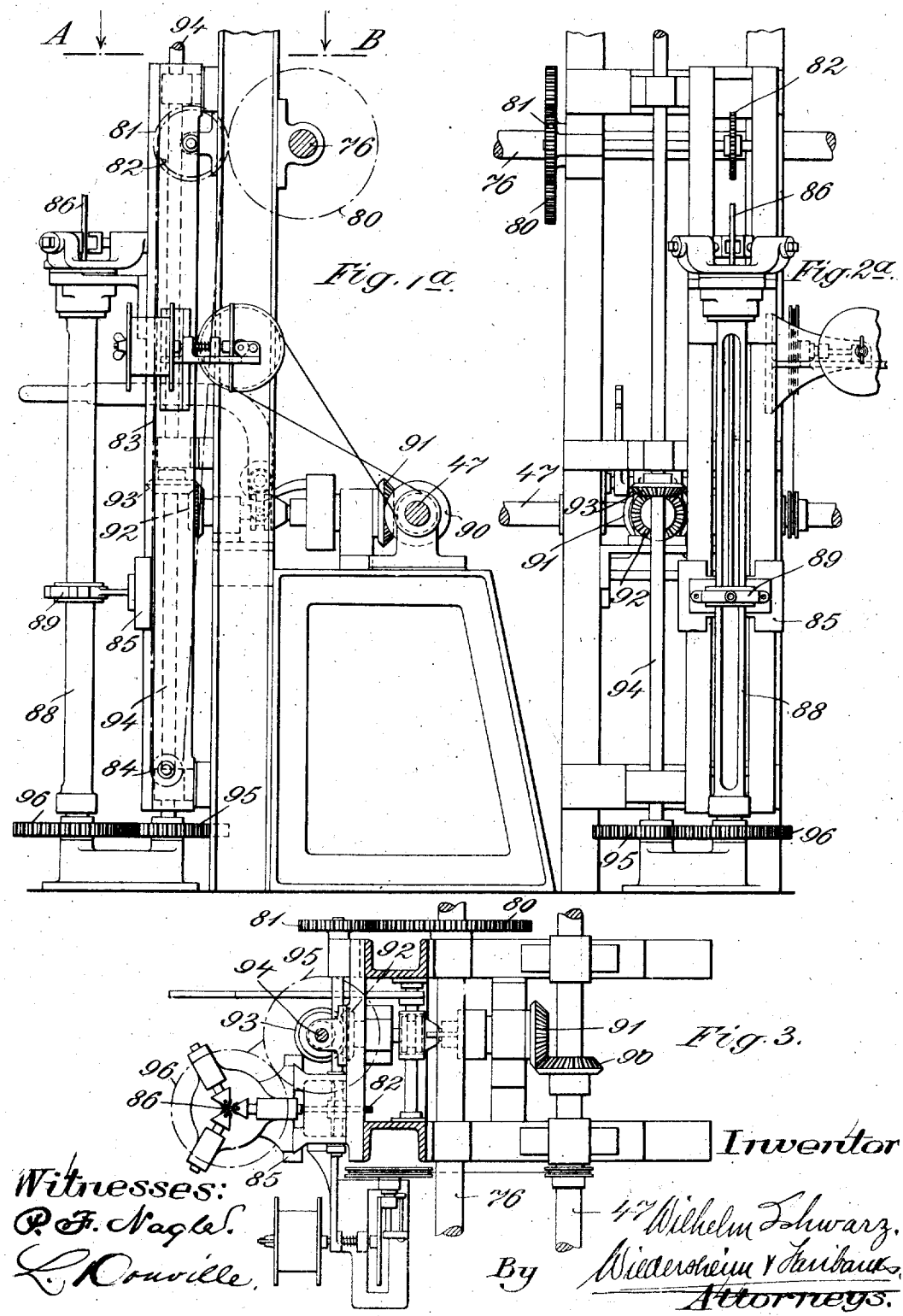
Figure 9A:
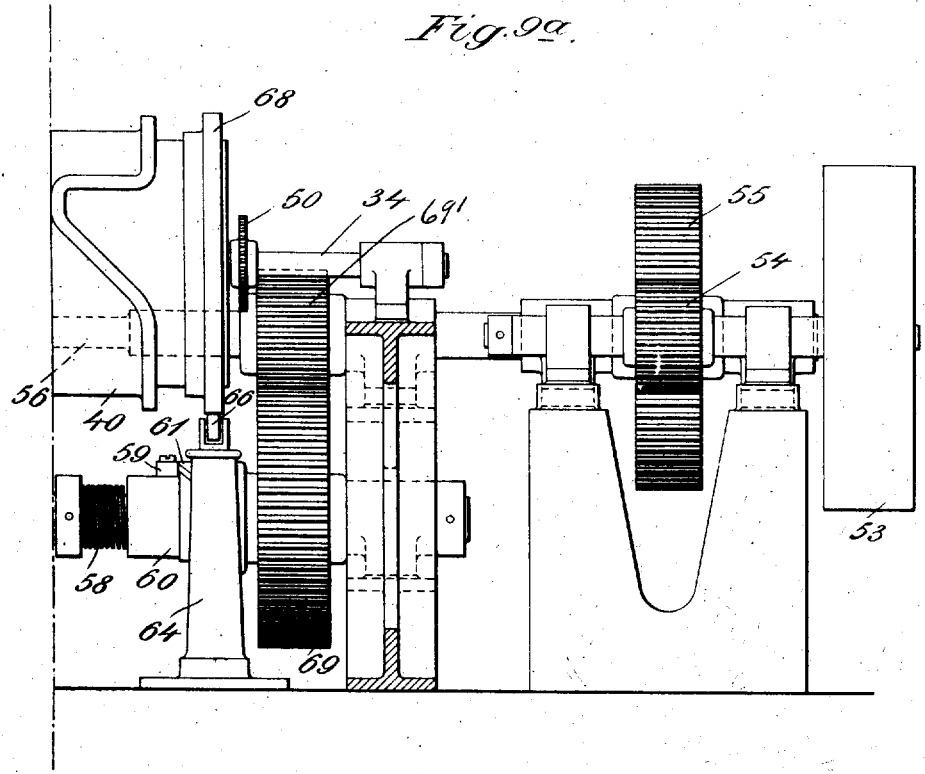

Figures 1, 1$^a$, 2 and 2$^a$ are side and front elevations. Fig. 3 is a section on the line A—B of Figs. 1, 1$^a$. Fig. 4 to a larger scale shows the winding mandrel with slide in longitudinal section, and Fig. 5 is a section on the line C—D of Fig. 4. Fig. 6 shows to an enlarged scale the device for reeling the finished hose, and Fig. 7 a section on the line E—F of Fig. 6. Fig. 8 is a side elevation, and Fig. 8$^a$ a diagram of the belt gear of the reversing apparatus. Figs. 9 and 9$^a$ are sections on the line G—H of Fig. 10, and Figs. 10 and 10$^a$ show a plan of the reversing gear. Figs. 11—15 show in part section details of the reversing apparatus.

The reversing apparatus (Figs. 8—15) consists of a framing 1 (Figs. 8, 9 and 10) on the vertical guide rods 2 of which a slide $2^1$ reciprocates, being actuated by the endless chain 5, passing round the sprocket-wheels 3 and 4. The shaft 6 of the lower sprocket-wheel 4 is rotated by a ratchet-wheel 7, the detent 8 of which is carried by a lever 9, which by means of the rod 10 is actuated by the shaft 56 continuously without reference to the motion (whether forward or backward) of the machine, in such manner, that the slide $2^1$ is caused to ascend.

In its top position the stop 12 of the slide $2^1$ strikes the lever 13 and effects reversal of the machine by throwing in a toothed clutch to be hereinafter described in detail. For the return of the slide $2^1$ into its bottom position, it is requisite to disengage the driving gear of the lower sprocket wheel 4, over which the chain 5 connected with the slide $2^1$ runs. For this purpose the detent on the lever 9 and the detent $8^1$ on the framing are joined by rods 14 to a lever 15 fulcrumed at 17 to a bracket 16 (Fig. 15) of the framing. At the bottom of one of the guide rods 2 of the slide $2^1$ is a sliding collar 18 connected by a rod 19 with a spring-actuated pin 20, which on ascent of the slide $2^1$ is held in its lowest position (Fig. 15) by a detent 22 mounted on a shaft 21. In this position the lever 15, owing to gravity, lies so low that the detents 8, $8^1$ engage with the ratchet wheel 7. At the top of the guide rods 2 is a sliding collar 23 similar to the collar 18 which collar 23 is connected by a rod 24 with an arm 25, (Fig. 15), mounted on the shaft 21 at an angle to the detent 22, in such manner that when the rising slide pushes the collar 23 upward, the detent 22 releases the pin 20, which owing to the action of its spring 26 forces the lever 15 up, whereby the detents 8, $8^1$ leave the ratchet wheel 7, so that the sprocket wheel and the slide $2^1$, which is connected with the chain 5 that runs over the sprocket-wheel, are released. The slide is now moved downward by a mechanism to be hereinafter described. At the bottom of its path it presses the collar 18 downward. This collar draws the pin 20 down also, which will thus be locked by the detent 22 again (Fig. 15) so that the lever 15 can descend and the detents 8, $8^1$ again engage the ratchet-wheel 7.

In order to prevent the lever 15 violently snapping up under the influence of the spring 26, its free end is provided with a brake 27.

When the slide 2¹ at the top of its path lifts the lever 13, a lever 28 rigidly connected with the lever 13 will be turned, which lever 28 by means of the rod 29 will turn a lever 31 turning in standards 30, and two toothed segments 32, 33 (Fig. 13) whereby a toothed clutch (Figs. 13 and 14) will be thrown in. On the shaft 34 of this clutch there slides a toothed sleeve 35, opposite to which there turns loosely on the shaft 34 the gear wheel 36 furnished with a clutch-half. The toothed segment 33 turns loosely on the engaging parts of the sleeve 35 and wheel 36. The collar of the toothed segment 33 is provided with a projection 37, which in connection with the guide-pin 38 of the sleeve 35 (actuated by a spring 39) normally keeps the two parts of the clutch apart. On ascent of the lever 13 the segments 32, 33 turn in the direction of the arrows (Fig. 13) the projection 37 releases the sleeve 35 and the clutch-halves engage, the shaft 34 being thus rotated by the wheel 36. The pulley 42' by means of an open and a crossed belt 48, 49, respectively, drives two pairs of fast and loose pulleys 45, 46 mounted on the shaft 47. The two belts are shipped by two pairs of belt shifters 41, 42, which are actuated by a cam-drum 40 mounted on the shaft 34 of the gear wheel 36 and a cam-drum 49¹ (Fig. 10) mounted on the shaft 48¹. The shifters 41, 42 are pressed constantly inward by springs or weights, so that the belts can be rapidly shipped. The shafts 34 and 48¹ of the cam-drums 40 and 49¹ which actuate the shifters are each provided with a gear 50, as seen in Fig. 10ᵃ, which gears are designed to be connected by a chain, not shown. The cam-drum 40 is driven by the pulley 51 of the shaft 43 with the aid of the belt 52, pulley 53, intermediate gears 54, 55, shaft 56 (Fig. 10) and gear wheel 57 which meshes with the wheel 36, when the clutch 35 is thrown in the manner above described.

Figure 11:
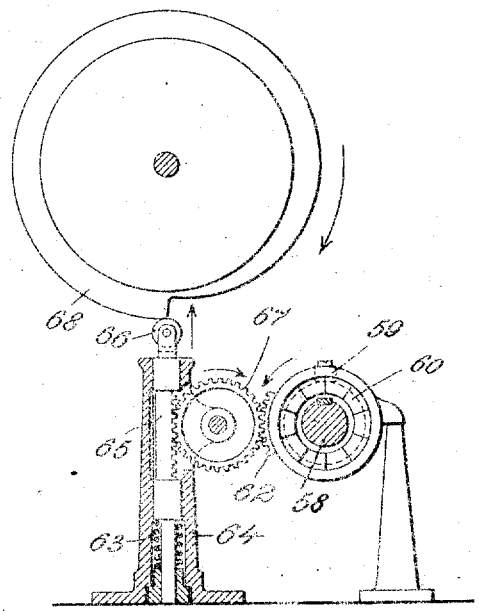
Figure 13:
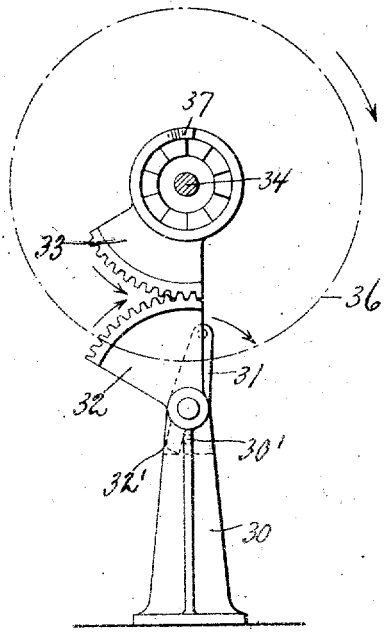
Figure 12:
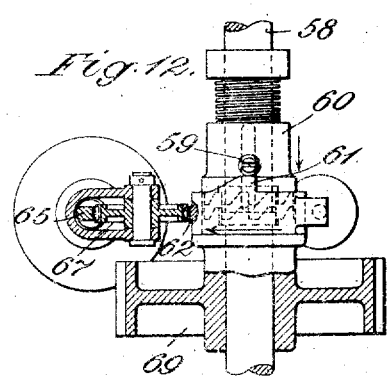
Figure 14:
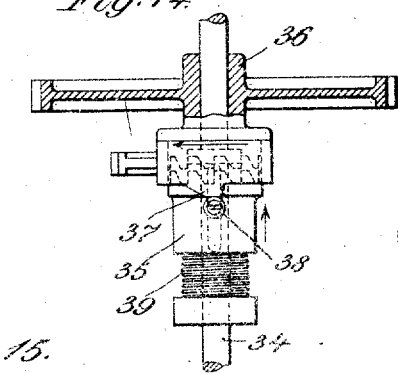
Figure 15:
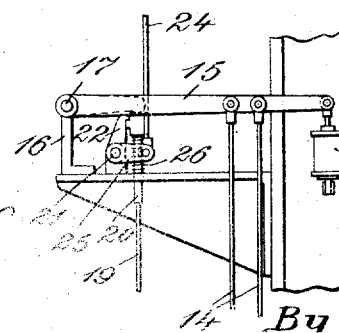

When the cam drums have turned so far that the backward motion of the machine has been completed, the device for drawing down the slide will be thrown in in a similar manner by a second toothed clutch (Figs. 11 and 12). This clutch is mounted on a shaft 58 and is thrown in by release of the stud 59 of the spring actuated clutch half 60 (which slides on the shaft 58), when the projection 61 of the toothed segment 62, located in front of the pin 59, on rotation of the latter in the direction of the arrow (Fig. 11) is moved. The toothed segment 62 is turned by actuation of the rack 65, which is guided in the standard 64 under the influence of a spring 63, and which has a roller 66 at its top end and which meshes with the gear 67 which engages with toothed segments 62.

The roller 66 rolls on a cam-ring 68 of the belt shifting drum 40. Owing to sliding of the toothed clutch-half 60 the latter comes into engagement with the toothed part of the gear wheel 69 mounted loosely on the shaft 58, whereby the said gear 69, which meshes constantly with the pinion 69¹, mounted fast on the shaft 56, rotates the shaft 58. In this manner crank disk 70 (Figs. 8 and 10) mounted on the shaft 58 of the gear 69 is turned, which crank-disk 70 is connected by a rod 71 with one end of a beam 73 which rocks on the shaft 72, the other end of the beam being provided with a toothed segment 74. The latter, according to its motion up or down, with the aid of a gear 75 turns a shaft 76 (Fig. 8) either to the left or right. In this manner, by means of spur gearing 77, 78, the shaft 79 of the sprocket wheel 3¹ is turned.

In the chain 5¹, which runs over the sprocket wheels 3¹ and 4¹, there is a catch 4ᵃ which engages with a stop on the slide 2¹ and carries the latter down. In the lowest position of the slide the chain 5¹ again travels idly upward owing to the action of the beam 73.

The clutch 35, 36, is disengaged by the pin 38 projecting from the part 35 having to bear on the inclined plane 37; this pressure causes actuation of the segment 33 and thus also of the segment 32, until a stop 32¹ projecting from the latter segment strikes a pin 30¹ protruding from the standard 30 (Fig. 9). The segment 33 is now set, and the pin 38 can travel right up the inclined plane 37, and thus effect disengagement of the clutch. During the backward motion of the toothed segments 32, 33, the lever 13, which is connected by the rods 28, 29 with the lever 31, is returned into its initial position.

The shaft 34, on which the cam drum 40 with cam ring 68 is mounted, is continually slowly advanced by special gearing 57, 36, so that when the beam 73 has completed its up and down motion, the cam ring 68 will have turned so far that the toothed clutch 60 is disengaged again, so that the shaft 58 is again brought to rest.

Figure 2:
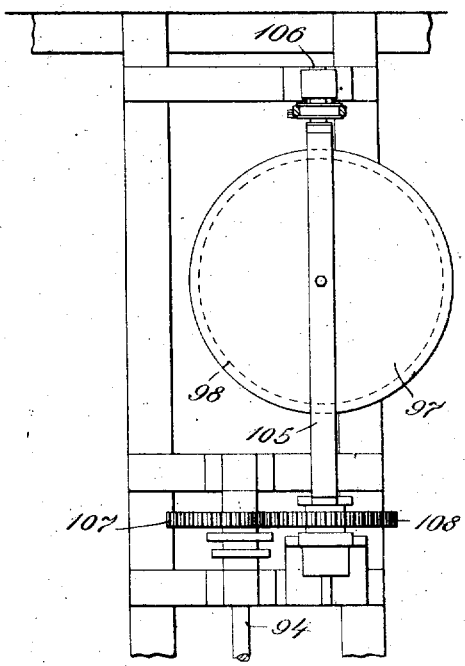

The various winding machines (only one of which is shown in the drawings) are driven by the main shaft 47 of the reversing apparatus by means of clutches. The machines thus run in one direction until the slide 2¹ has reached its top position, and then work a few turns backward. The shaft 76 operated by the beam 73 likewise runs past all the winding machines and in the same manner as with the reversing apparatus, by means of spur gearing 80, 81 (Fig. 2ᵃ) drives the chain gear 82, 83, 84 (Fig. 1ᵃ) which likewise by means of a catch draws the winding-slide 85 downward and then travels idly upward.

In winding the hose, the mandrel 86 (Figs. 4 and 5) is drawn into the hose. This mandrel is secured to a traveler 87 which works in the hollow shaft 88 and is connected with the slide 85 by a collar 89. The hollow shaft 88 is rotated by the shaft 47 with the aid of gears 90, 91, 92, 93, the shaft 94 and the gears 95, 96 (Figs. 1ª—3). It turns the mandrel 86 with it, which travels up the hollow shaft 88, carrying the slide 85 with it. This slide after completion of the hose will be again moved downward by the return mechanism, whereby the mandrel is drawn out of the hose.

For winding up the finished piece of hose the device shown in Figs. 6 and 7 is employed. The winding-up reel 97 is connected with a friction disk 98, actuated by a friction roller 99. The shaft of this fricton roller carries a ratchet-wheel 100, which is actuated through the lever 102, which carries the detent 101, by the collar 103 of the stationary eccentric 104, when the frame 105, in which the reel 97 is mounted, turns. In this manner, on each rotation of the frame 105 the ratchet wheel 100 will advance through the space of one tooth and the reel 97 will be rotated through the distance corresponding to the length of hose manufactured during this time. The rotation of the frame 105 on its shaft 106 is effected in a well known manner by the pair of gear wheels 107, 108 from the shaft 94.

The manner of operation of the machine is as follows:—From the main driving shaft 47, with which all the winding machines are coupled by suitable clutches, and which is driven from the belt pulley 43, the hollow shaft 88 is rotated, as shown in the drawings with the aid of the gears 90, 91, 92, 93, shaft 94 and gears 95, 96. The shaft 88 rotates the mandrel 86 with it, on which the tape from a reel (not shown in the drawings) is wound to form a hose. The reel 97 onto which the finished hose is wound, is rotated by means of the shaft 94 and gear wheels 107, 108; together with the frame 105, carrying the reel 97, in the same direction as the hollow shaft 88, in order to prevent twisting of the finished hose. During this forward motion of the machine, the slide $2^1$, secured to the chain 5, is moved slowly upward by means of the shaft 43, pulley 51, belt 52, pulley 53, gears 54, 55, shaft 56, rod 10, and ratchet gear mechanism 7, 8, 9. When the slide $2^1$ has reached its highest position, as is the case at the completion of a hose-winding, at which time also the hose winding-slide 85 will also have reached its highest position, it will strike the lever 13, which throws in the clutch 35 in the already described manner. The ratchet gear 7, 8, 9 is now disengaged, so that the sprocket wheel 4 and the slide $2^1$, connected with the chain 5, are released. On the clutch 35 being thrown in, the shaft 34, which is designed to be connected with the shaft $48^1$, by means of the gears 50, and chain not shown, is rotated. The cam drums 40 and $49^1$ mounted on these shafts effect shipping of the open and crossed driving belts 48, 49, whereby backward motion of the winding machine is brought about. When the cam drums have rotated so far that the backward motion of the winding machine is completed, the second clutch 60 is thrown in, in the already described manner which clutch causes the toothed segment 74 to execute a down and up motion. This segment turns the shaft 76. Through the rotary motion of the latter the chain $5^1$, running over the sprocket wheels $3^1$, $4^1$, will be actuated with the aid of the spur gearing 77, 78 and the slide $2^1$ will be drawn downward; and furthermore, with the aid of the spur gearing 80, 81, the chain gear 82, 83, 84, will be driven and thus the winding-slide drawn downward and with it the mandrel 86 drawn out of the hose. During this time the clutches 35 and 60 will be automatically disengaged in the above described manner and the slide $2^1$, now arrived below, again throw in the ratchet gear mechanism 7, 8, 9, so that the slide $2^1$, will again begin to ascend simultaneously with the forward motion of the winding machine.

Having thus described my invention, what I claim as new and desire to secure by Letters Patent is:—

1. In a metallic hose winding machine, in combination, a vertically reciprocating winding-slide; means operating the same; a shaft driving said means; a second shaft driving the first one; a vertically reciprocating machine-slide; vertical chain gear actuating the same and driven by the second said shaft; ratchet gear driving the bottom wheels of the chain gear; clutch mechanism operated by the slide in its top position; reversing-gear thrown in by the clutch; and mechanism actuated by the reversing gear for quick return of the machine-slide and thus also of the winding-slide to the bottom position; means for disengaging the ratchet gear during such return motion; and means for automatically throwing it in again when the machine-slide is in its bottom position; substantially as described.

2. In a metallic hose winding machine, in combination, a slide; vertical rods guiding the same; vertical chain gear operating the slide; ratchet mechanism, having two detents, for driving the bottom wheels of the chain gear; a sliding stop at the top of the guide rods; means, actuated by the stop when struck by the slide, for throwing the ratchet detents out of engagement with their wheel; a sliding stop at the bottom of the guide rods; and means, actuated by this stop when struck by the slide, for throwing in the detents again automatically; substantially as described.

3. In a metallic hose winding machine, in combination, a slide; vertical rods guiding the same; vertical chain gear operating the slide; ratchet mechanism having two detents for driving the bottom wheels of the chain gear; a stop at the bottom of the guide rods and a spring-actuated rod pivoted to the stop; a spring-actuated stop at the top of the guide rods; a detent, pivoted to the framing, locking the said bottom stop rod and disengaged by the top stop when the latter is struck by the slide; and a gravity drop arm fulcrumed to the framing and linked to the detents and lifted by the bottom stop rod on release of this rod; substantially as described.

4. In a metallic hose winding machine, means for reversing the motion of working, comprising, in combination, a main driving shaft; shafts geared together, carrying cam-drums; a winding-machine driving shaft; fast and loose pulleys mounted thereon and connected by belting with the main driving shaft; shifters for the fast and loose pulley belts, actuated by the cam-drums; a vertically reciprocating slide; and means actuated by the slide in its top position for throwing the cam-drums into gear with the main driving shaft; substantially as described.

5. In a metallic hose winding machine, means for reversing the motion of working, comprising, in combination, a main driving shaft; a shaft driven thereby; an intermediate shaft carrying a pinion; gear for driving the same from the second said shaft; shafts geared together, carrying cam-drums; a clutch, one half of which carries a toothed wheel which gears with the said pinion, mounted on the one cam-drum shaft; a winding machine driving-shaft; fast and loose pulleys mounted thereon and connected by belting with the first said driving shaft; shifters for the fast and loose pulley belts actuated by the cam-drums; a vertically reciprocating slide and lever mechanism actuated by the said slide in its top position for operating the clutch and causing its shaft to be driven by the said pinion shaft; substantially as described.

6. In a metallic hose winding machine, in combination, means for reversing the motion of working, comprising a main driving shaft; shafts geared together, carrying cam-drums; a winding-machine driving shaft; fast and loose pulleys mounted thereon and connected by belting with the main driving shaft; shifters for the fast and loose pulley belts, actuated by the cam drums; a vertically reciprocating slide; chain gear operating the latter; and means actuated by the slide in its top position for throwing the cam-drums into gear with the main driving shaft; and means for effecting quick return of the slide, comprising a cam-disk mounted on one of the cam-drums; a shaft carrying a crank-disk; clutch mechanism actuated by the cam-disk for coupling the crank disk shaft with the driving gear; a beam rocking in the framing, having its one end coupled to the crank-disk and carrying at its other end a toothed segment; and gearing for transmitting the motion of the beam segment to the slide chain gear; substantiallly as described.

In witness whereof I have hereunto signed my name this 12th day of November, 1906, in the presence of two subscribing witnesses.

WILHELM SCHWARZ.

Witnesses:
JOHANNIS EDER,
A. SCHARPWINKEL.